F. J. OLSEN.
FREE WHEEL HUB WITH PLURALITY OF GEARS.
APPLICATION FILED NOV. 4, 1911.
1,252,939.
Patented Jan. 8, 1918.
2 SHEETS—SHEET 1.
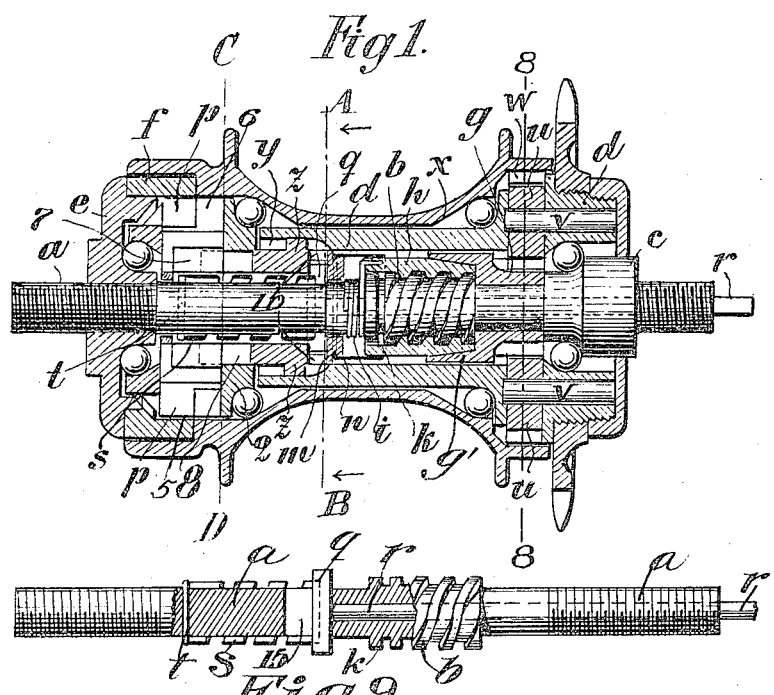
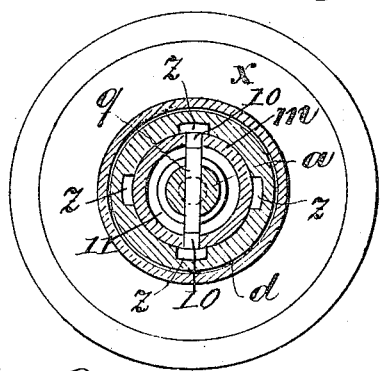
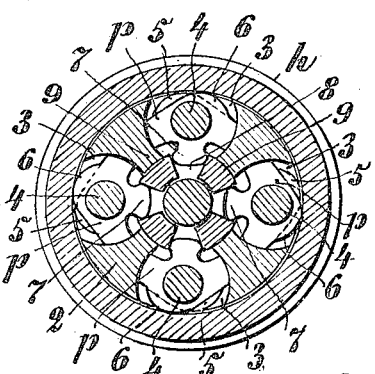
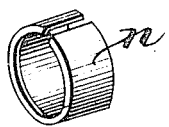

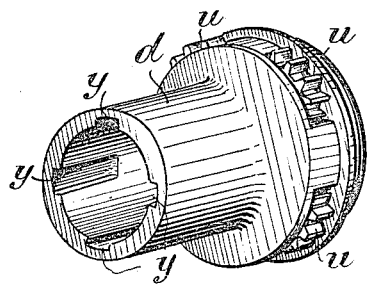
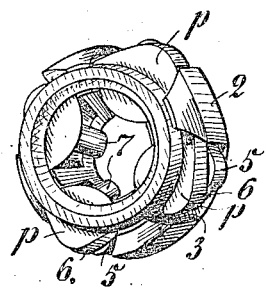
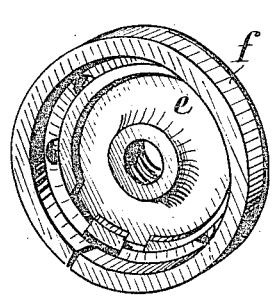
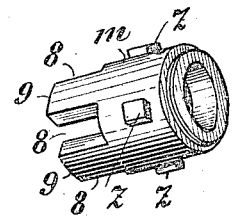
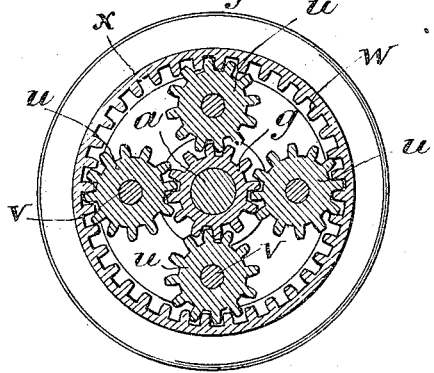

UNITED STATES PATENT OFFICE.

FREDERIK JOHANNES OLSEN, OF ESKEBJERGGAARD PER SVEBÖLLE, DENMARK.

FREE-WHEEL HUB WITH A PLURALITY OF GEARS.

1,252,939.   Specification of Letters Patent.   Patented Jan. 8, 1918.

Application filed November 4, 1911. Serial No. 658,621.

*To all whom it may concern:*

Be it known that I, FREDERIK JOHANNES OLSEN, a subject of the King of Denmark, residing at Eskebjerggaard per Svebölle, Denmark, have invented new and useful Improvements in Free-Wheel Hubs with a Plurality of Gears, of which the following is a specification.

My invention relates to a hub for bicycles with a free wheel and which is capable of changing the ratio of transmission between the pedals and the wheel, in which the gears for transmitting the motion from the ordinary sprocket, or equivalent member, to the wheel, are continually in mesh with each other, and which hub is characterized by the fact that the change of transmission ratio of the hub is effected by axial displacement of a sleeve on a worm on the fixed shaft of the hub.

It will be understood that sun and planet wheel gearing mechanism have been previously known in which the planet wheels do not roll on the sun wheel when running with a certain speed. However, in such construction, the outer hub casing itself forms the planet wheel carrier, and consequently the thrust must be transmitted through the teeth of the planet wheel during the entire running period, independent of whether the bicycle is running with one or the other speed ratio, which is not the case in the hub forming the object of this invention.

Furthermore, in previously known constructions, the sun wheel is coupled by means of two clutches to the fixed shaft or to the hub casing, which, by incomplete engagement, can give rise to danger of damaging parts of the clutch, and at any rate, cause jerks.

On the contrary, the sun wheel in the hub according to the present invention is coupled to the fixed shaft through friction, by a friction brake body acted upon by the person riding the bicycle, which is brought into and out of frictional engagement with a clutch member, which clutch member is in the form of a nut and screws itself forward or backward in the longitudinal direction of the hub on a thread on the fixed shaft, thereby causing the coupling or uncoupling of the sun wheel to the fixed shaft. It is, to be sure, previously known to effect the change of the speed ratio through friction acting on screw parts; but in such hubs the axial coupling thrust is transmitted through ball bearings of the hub, while the arrangement of the thread fixed on the shaft in the present invention makes possible the taking up of the thrust between fixed parts.

A preferred embodiment of my invention is shown in the drawing.

In the accompanying drawing:—

Figure 1 shows a longitudinal section of a wheel hub embodying my invention.

Fig. 2 is a sectional view taken on the line A—B, Fig. 1.

Fig. 3 is a section taken on the line D—C, Fig. 1.

Fig. 4 is a perspective view of a portion of the inner hub casing.

Fig. 5 is a perspective view of a hub and brake clutching means.

Fig. 6 is an inside view of a portion of the clutch means.

Fig. 7 is a perspective view of an actuating sleeve.

Fig. 8 is a vertical sectional view on the line 8—8 of Fig. 1.

Fig. 9 is a view of the fixed axle, partly in section and partly in elevation.

Fig. 10 is a perspective view of a friction spring sleeve.

Fig. 11 is a side view of one of the bodies $p$.

Throughout the separate views the same part is designated by the same reference character.

Referring more particularly to the drawing, $a$ is the fixed shaft, which is provided with a worm thread $b$ and a cone $c$ for the ball bearing. $d$ is the inner hub casing and $e$ a disk threaded on the fixed shaft $a$ serving to secure in place the brake ring $f$ as well as other parts subsequently mentioned. A sun gear $g$, one face of which is provided with a hollow cone $g'$, is mounted loosely on the shaft $a$ between the worm $b$ and the cone $c$. This sun gear $g$ can be coupled to or released from respectively, the shaft $a$ by means of an interiorly threaded sleeve $h$ arranged on the worm $b$ for axial displacement of the sleeve $h$. Sleeve $h$ is cone shaped at one end so that it serves as a friction clutch member, the sun gear $g$ having a flange thereon, adapted to engage the cone shaped end of the sleeve and acting as a complemental clutch member therefor. The sleeve $h$ is acted upon by a torsion spring $i$, which is adapted to turn the sleeve so as to uncouple the same from the wheel $g$ whenever the frictional engagement between the two parts has been released. This initial release of the frictional engagement between the sleeve and the hollow cone $g'$ is accomplished in a manner hereinafter described. $k$ is a shoulder on the shaft $a$ limiting the displacement of the sleeve $h$ due to the action of the spring $i$, which displacement is caused by the threaded engagement of the sleeve with the worm $b$.

As just mentioned, the displacement of the sleeve $h$ in one direction is caused by the spring $i$. The displacement of the sleeve $h$ in the opposite direction along the shaft, so that it may engage the hollow cone $g'$, takes place by means of a resilient coupling ring $n$, which engages one end of the sleeve $h$, and a sleeve $m$, which carries the resilient coupling ring $n$. The ring $n$ is pressed into a groove in the sleeve $m$ with sufficient pressure so that it is held frictionally therein and caused to revolve with the sleeve $m$, said sleeve being shiftable axially of the part $a$. The sleeve $m$ is so placed as to surround the fixed shaft $a$ and is mounted within one end of the inner hub casing $d$. The sleeve $m$ is provided with projections $z$ which fit in longitudinal slots $y$ in the hub casing $d$ so that the sleeve $m$ is forced to revolve with the hub casing $d$ but can move longitudinally of the shaft $a$ relatively to the hub casing $d$. Now the longitudinal movement of the sleeve $m$ which has just been mentioned may take place in either direction longitudinally of the shaft $a$. For pushing the sleeve in one direction I provide a rod $r$ which is led through the hollow shaft $a$ and which is coupled to the sleeve $m$ by means of a pin $q$. The end of the pin $q$ where it projects beyond the shaft $a$ is accommodated by an annular slot or groove 11, there being apertures 10 in the sleeve to permit the pin $q$ to be put in place. It will be understood, moreover, that the shaft $a$ is provided with a longitudinal slot 15 which permits the pin $q$ to move longitudinally of the shaft.

The pin $q$ is also acted upon by spring $s$ which is placed within the sleeve $m$ surrounding the shaft $a$ so that it bears against the pin $q$ at one end and against the pin $t$ at the other end. This spring serves to move the sleeve $m$ in the direction opposite to that in which it is moved by the rod $r$ and normally holds the sleeve $m$ in the position shown in Fig. 1. In this position the gear $g$ is coupled with the shaft $a$. The gear $g$ is constantly in mesh with the gears $u$ which turn on pins $v$ and the gears $u$ are constantly in mesh with the inner toothed rim $w$ of the outer hub casing $x$.

The outer hub casing is denoted by the reference character $x$. Fixed to the outer hub $x$ and revolubly supported on the end member $e$ is the brake ring $f$ which acts in a well-known manner. Coöperating with the brake ring $f$ and the inner surface of the outer hub casing are driving bodies $p$ which serve not only to couple the brake ring with the inner hub casing $d$ for direct drive but also act as braking members in the ordinary manner. Within the casing $x$ is a ring-like casing 2 which is mounted so that it may revolve independently of the outer casing $x$. The casing 2 is formed with a number of cavities such as 3, shown in Fig. 3, in which are mounted the bodies $p$ previously mentioned. The bodies $p$ fit snugly within the cavities 3 in order to economize space, and are rotatably mounted on studs 4 which preferably are integral with the part 2. The outer circumferences of the bodies $p$, which may project beyond the outline of the cavities 3, are made in the form of cam surfaces, there being two of these cams 5 and 6 on each of the bodies $p$. The cams 5 are so arranged that they can engage the brake ring $f$ and the oppositely arranged cams 6 are so placed that they can engage the cylindrical surface of the outer hub casing $x$. Each of the cams 5 and 6 extends only about half the length of the bodies $p$, in the direction along the axis of the shaft $a$. The bodies $p$ further carry radial projections 7 of the casing shown in Figs. 3 and 11, which projections extend along the axis of the shaft $a$ into slots 8 in the end of the sleeve $m$, formed between prongs 9 which are integral with the sleeve $m$.

In the position shown in Fig. 3, the cams 5 do not exert any pressure against the brake ring $f$, and the cams 6 do not touch the inner surface of the casing, so that the outer hub casing can run freely on its ball bearings in both directions. When the cranks of the bicycle are turned forwardly together with the sprocket wheel and inner hub casing $d$, the turning of the inner casing $d$ and the sleeve $m$ causes the projections 7 disposed between the prongs 9 to turn the bodies $p$ around the studs 4 so as to cause the cams 6 to bear against the cylindrical surfaces of the outer hub casing thereby coupling the outer hub casing by friction to the inner hub casing and causing the outer hub casing to rotate with the sprocket wheel. If then the crank of the bicycle is turned backward the teeth 9 act upon the projections 7 and turn the bodies $p$ in the opposite direction. The cams 5 are then brought to bear against the brake ring $f$, extending the same against the casing so as to obtain a braking action.

The mechanism for changing the ratio of transmission acts in the following manner:—In the position shown in Fig. 1 the hub axle gives the high speed transmission, the gear $g$ being coupled to the fixed shaft $a$. When the inner hub casing $d$ is rotated by means of the sprocket wheel, the gear $g$ forces the gear $u$ to roll around the same, which motion through the inner toothed rim $w$ is transferred to the outer hub casing at a speed dependent upon the proportion of the number of teeth on the gear *g* and the toothed rim *w*. The bodies *p* which are acted upon by the sleeve *m* will not, in this case, come into action because the hub casing *x* is driven by the gears in the same direction as the bodies are then turning but at an augmented speed. Consequently any frictional engagement between the outer hub casing and the bodies *p* will merely accelerate the bodies *p* and the inner casing 2 so that the sleeve *m* will turn the bodies *p* in a direction to release such frictional engagement.

During the time that the bicycle is running by momentum, the cranks, and with them the sprocket wheel and the inner hub casing *d* are stationary. Motion is then transmitted from the toothed rim *w* through the gears *u* to the gear *g* which is thereby turned backward causing a release of the sleeve *h* from the hollow cone of the gear *g*. If forward pedaling again takes place, the inner hub casing *d* is turned and the sleeve *m* is likewise turned by means of the projections *z*. Thereby the ring *n* fixed on the sleeve *m* screws the sleeve *h* forwardly into renewed engagement with the gear *g*. When now, during the free running of the bicycle, during which the sleeve *h* is screwed out of engagement with the gear *g*, the rod *r* is pushed to the left, the sleeve *m* is, by means of the pin *q*, pushed to the left against the ring *f*. The ring *n* is hereby pushed so far away from the sleeve *h* as to release the same, whereafter the spring *i* turns backward the sleeve *h* until its frame abuts the shoulder *k*. It is evident that the ring *n*, on renewed forward pedaling, cannot turn forwardly the sleeve *h* into engagement with the gear *g*, and the gearing thereupon runs idly. Under this condition, however, motion is transmitted through the inner hub casing *d* to sleeve *m* and the bodies *p* directly to the outer casing *x* whereby the hub acts as an ordinary single acting hub with back pedaling brake, and the ratio of transmission between the sprocket wheel and the outer casing is unity. If the rod *r* be released, the spring *s* moves the pin *q*, and thereby the sleeve *m*, and the ring *n* to the right, so that the latter again acts upon the sleeve *h*, whereupon the gearing is rendered active. As a matter of course, the brake ring *f* can also be actuated by back pedaling when running with the high speed gear.

Having now described and ascertained my said invention and in what manner same is to be performed I declare that what I claim and desire to secure by U. S. A. Letters Patent is:

1. In bicycle gearing, the combination with a stationary axle having a threaded portion, a sun gear loose on said axle, a sleeve on said axle having threaded engagement with said threaded portion and adapted to lock said sun gear to said axle, a revoluble wheel hub, a driving member geared to the wheel hub and sun gear, a friction ring connected to rotate with said driving member and adapted for engagement with said sleeve to actuate the same whereby the sleeve locks the sun gear on said shaft, and means whereby said friction ring may be moved axially out of engagement with said threaded sleeve.

2. A wheel hub structure for providing a plurality of transmission ratios comprising in combination, an outer hub member having an interior ring gear fixed thereon, a central fixed shaft, an inner hub member having driving means fixed thereto, a sun gear loosely mounted on said shaft, planetary gears carried by said inner hub member and meshing with said ring gear and with said sun gear, a worm fixed on said central shaft, a cone member provided with interior threads complemental to said worm and carried thereby, said sun gear being adapted to be frictionally fixed to said cone member, a spring fixed to said central shaft and adapted to turn said cone member away from said sun gear when the two have been released by the action of the planetary gears on the sun gear when the inner hub member is held stationary, a ring member frictionally engaging said cone member, and adapted to turn the same into engagement with said sun gear, a sleeve to which said ring member is attached and by which the same is rotated, connections between said sleeve and said inner hub member, an inner rotatable casing mounted within said outer hub member in driven relation to said inner hub, cam members pivotally connected to said inner casing and adapted to bind against the inner face of said outer hub member, said cam members being adapted to drive said outer hub casing forwardly or to brake the same during back pedaling when the cone member is set for either high or low speed.

3. A wheel hub structure for providing a plurality of transmission ratios between the pedal shaft and the hub of the driven wheel of a bicycle comprising in combination, an outer hub member having an interior ring gear fixed thereon, a central hollow fixed shaft, an inner hub member having driving means fixed thereto, a sun gear loosely mounted on said central shaft, planetary gears carried by said inner hub member and meshing with said ring gear and with said sun gear, a worm fixed on said central shaft, a friction clutch member provided with interior threads complemental to said worm and carried thereby, said sun gear having rigid therewith a clutch member complemental to said first mentioned clutch member, a spring fixed to said central shaft and adapted to turn said first mentioned clutch member away from its complemental clutch member when the two have been released by back pedaling, a sleeve member mounted in driven relation to said inner hub member and arranged to slide axially of said shaft, a ring member fixed to said sleeve member and arranged to frictionally engage said first mentioned clutch member, and adapted to turn the same into engagement with said second mentioned clutch member, an inner rotatable casing mounted within said outer hub member in driven relation to said sleeve member, cam members pivotally connected to said inner casing and adapted to bind against the inner face of said outer hub member, said cam members being adapted to drive said outer hub casing forwardly or to brake the same during back pedaling, said sleeve member engaging said cam members to actuate same in either direction, and a rod slidably mounted in said hollow shaft and arranged to throw said ring member into or out of engagement with said first mentioned clutch member.

In testimony whereof I have affixed my signature in presence of two witnesses.

FREDERIK JOHANNES OLSEN.

Witnesses:
 VIGGO BLOM,
 CECIL WILHELM SCHON.

Copies of this patent may be obtained for five cents each, by addressing the "Commissioner of Patents, Washington, D. C."